(12) United States Patent
Fujino

(10) Patent No.: US 8,068,246 B2
(45) Date of Patent: Nov. 29, 2011

(54) IMAGE PROCESSING APPARATUS AND CONTROL METHOD AND CONTROL PROGRAM THEREOF

(75) Inventor: Toru Fujino, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1398 days.

(21) Appl. No.: 11/017,725

(22) Filed: Dec. 22, 2004

(65) Prior Publication Data

US 2005/0141026 A1 Jun. 30, 2005

(30) Foreign Application Priority Data

Dec. 26, 2003 (JP) ................................ 2003-432438

(51) Int. Cl.
*G06F 3/12* (2006.01)
(52) U.S. Cl. ...... 358/1.15; 358/1.13; 709/221; 709/224; 709/225; 709/227; 709/250; 710/8
(58) Field of Classification Search .............. 358/442, 358/1.13, 1.15; 709/221, 224, 226, 227, 709/250; 710/8
See application file for complete search history.

(56) References Cited

U.S. PATENT DOCUMENTS

| | | | | |
|---|---|---|---|---|
| 5,675,782 A | * | 10/1997 | Montague et al. ............... | 726/4 |
| 5,935,217 A | * | 8/1999 | Sakai et al. ................... | 709/249 |
| 5,999,708 A | * | 12/1999 | Kajita ........................... | 358/1.15 |
| 6,590,673 B2 | * | 7/2003 | Kadowaki .................... | 358/1.15 |
| 6,678,068 B1 | * | 1/2004 | Richter et al. ............... | 358/1.15 |
| 2003/0140344 A1 | * | 7/2003 | Bhatti ............................. | 725/62 |
| 2003/0193685 A1 | * | 10/2003 | Kageyama ................... | 358/1.14 |
| 2004/0071159 A1 | * | 4/2004 | Douglas et al. ............... | 370/465 |

OTHER PUBLICATIONS

"Microsoft® Windows® XP Professional Resource Kit, Second Edition", Microsoft Press, ISBN 978-0-7356-1974-6, published Jun. 11, 2003, selected excerpts.*
IBM Technical Disclosure Bulletin NN9202342 ("Selection of Printer as the Default Within OS/2 Office", dated Feb. 1992).*
Universal Serial Bus Specification, Revision 2.0, Apr. 27, 2000.
IEEE Standard 802.3-2002, Mar. 8, 2002.

* cited by examiner

*Primary Examiner* — King Poon
*Assistant Examiner* — David S Cammack
(74) *Attorney, Agent, or Firm* — Fitzpatrick, Cella, Harper & Scinto

(57) ABSTRACT

An image processing apparatus comprising an local interface and a network interface and capable of transmitting an image data to a host apparatus with ease.
A local I/F management section and a network I/F management section are prepared, and when image data read by a scanner control section is to be transmitted via the interfaces, activated states of the local interface and the network interface are detected. In case the local interface only is in an activated state, image data is transmitted to a host apparatus connected to the local interface, without the host selection by a predetermined user interface means according to a predetermined key operation, while in case the network interface is in an activated state, image data is transmitted to the host apparatus selected by the host selection by the user interface means according to the predetermined key operation through the local interface or network interface.

15 Claims, 7 Drawing Sheets

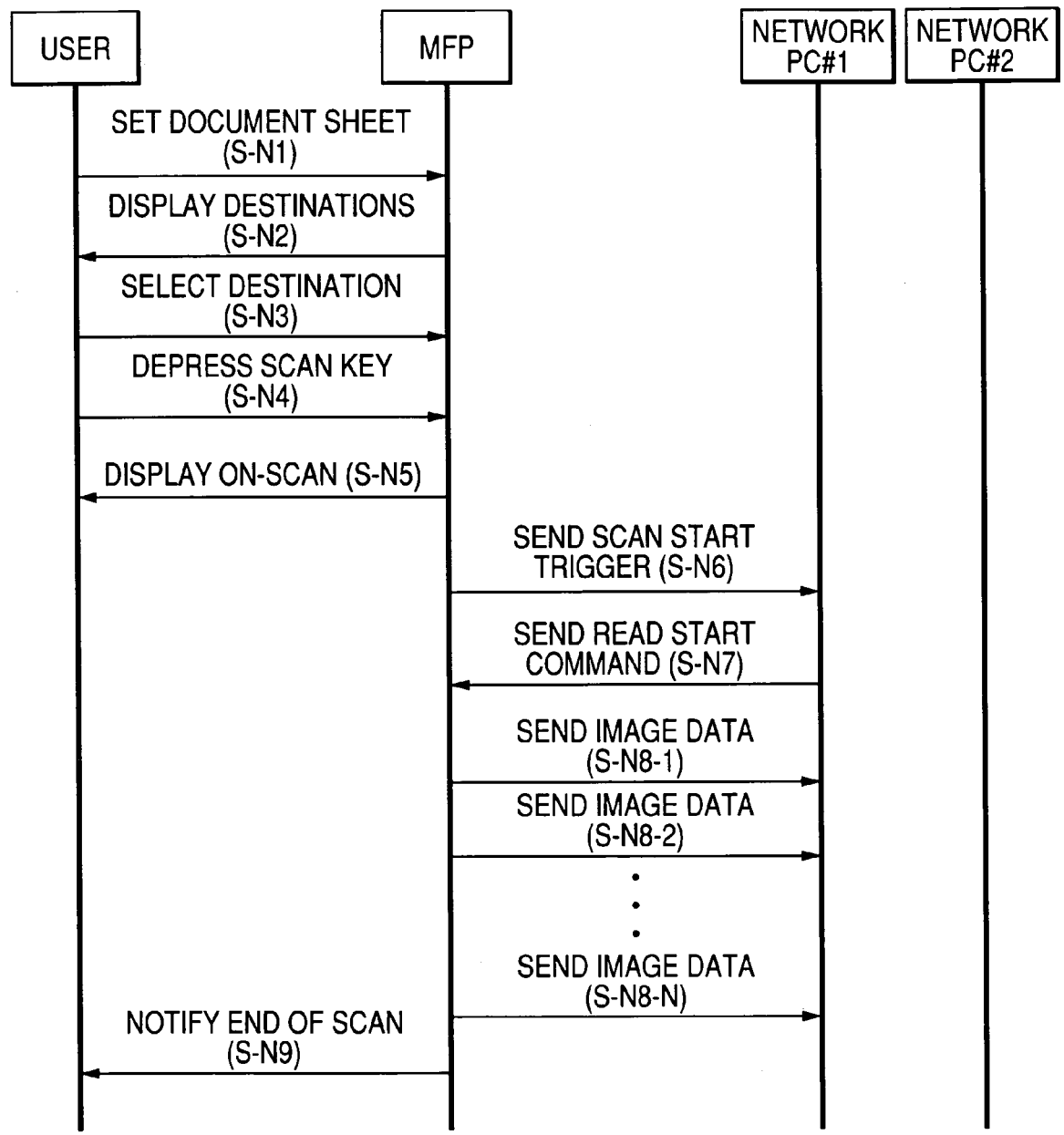

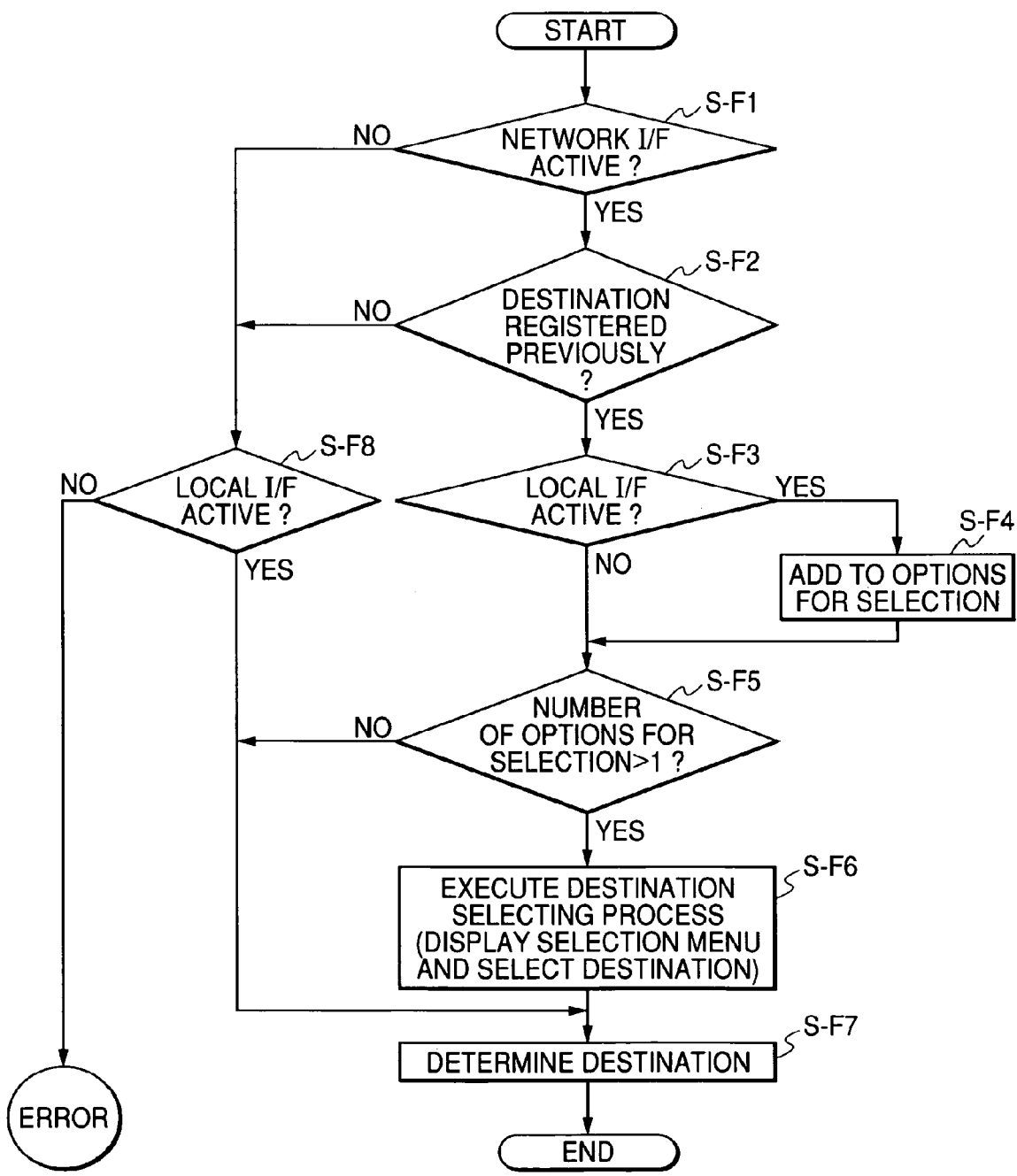

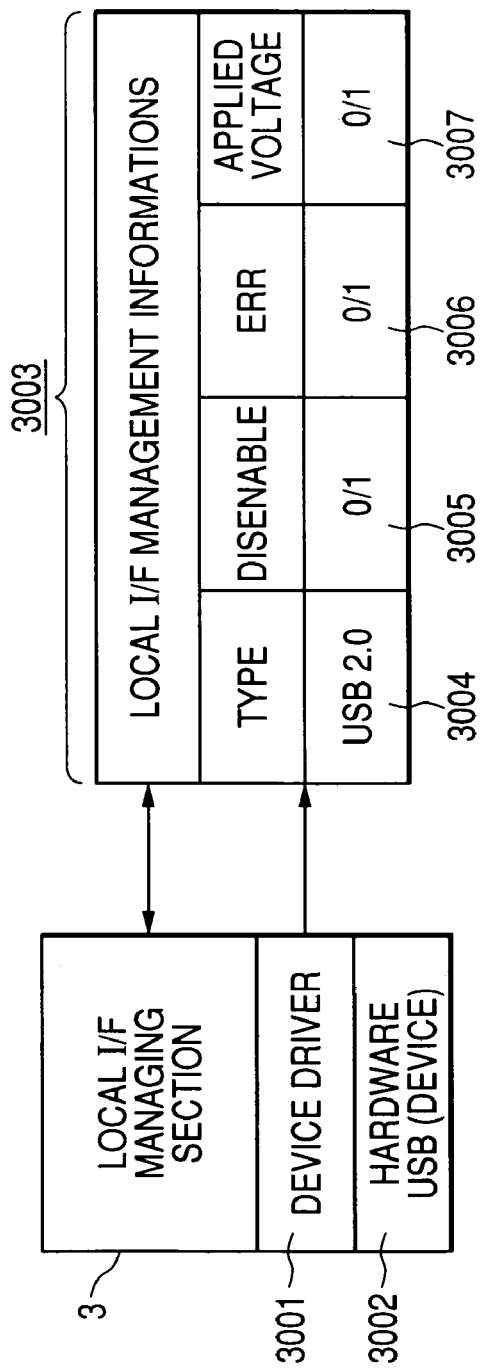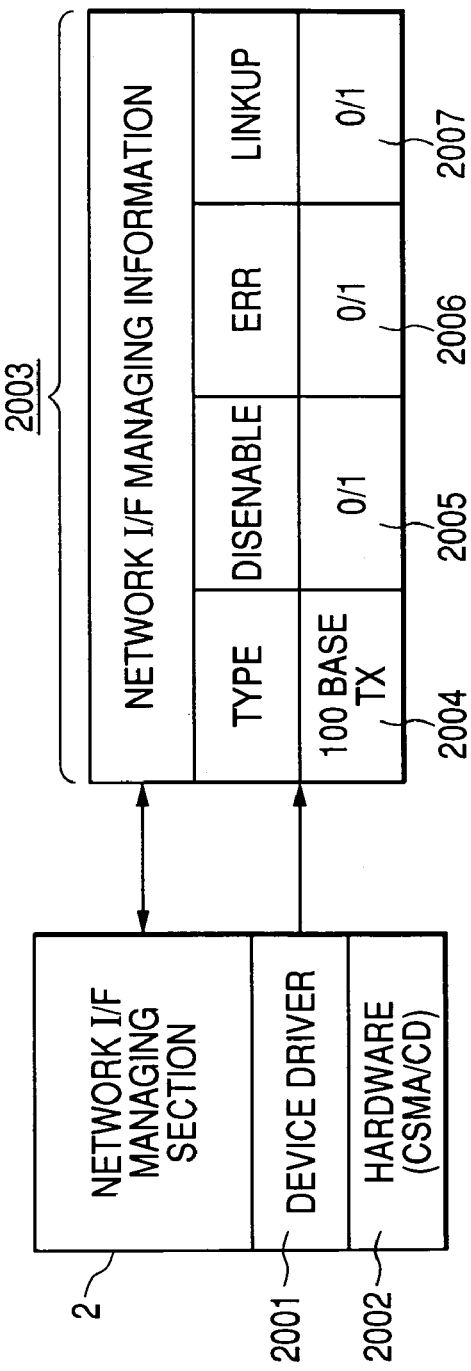
FIG. 5A
FIG. 5B

IMAGE PROCESSING APPARATUS AND CONTROL METHOD AND CONTROL PROGRAM THEREOF

BACKGROUND OF THE INVENTION

1. Field of the Invention

The present invention relates to an image processing apparatus, and a control method and a control program thereof, said apparatus comprising a local interface and a network interface, and capable of transmitting an image data to a host apparatus through the local interface and the network interface.

2. Related Background Art

In recent years, in general, as an apparatus such as a facsimile, a scanner, a printer and the like as well as an image processing apparatus such as a multi function machine (MFP: multi function peripheral) combining plural ones of functions of these apparatuses, a product comprising both of interfaces such as an I/F (local I/F) to be connected on one for one base with a PC (personal computer) such as an USB (see non-patent document 1 as mentioned below), and an I/F (network I/F) connectable with a plurality of PCs through LAN using CSMA/CD (see non-patent document 2 as mentioned below) and the like has come to be provided.

In this type of the conventional apparatuses, there has been known an apparatus provided with a public network IF used for a facsimile communication and the like and a local I/F used for connecting to a host apparatus such as a PC to utilize printing and scan functions, in recent years. However, accompanied with the provision of the recent technical standard of an internet facsimile, the requirement of a network printing function and so on, a multi function machine comprising a network I/F such as Ethernet (brand name) has entered the stage.

[Non Patent Document 1]
UNIVERSAL SERIAL BUS: http://www.usb.org/faq/
[Non Patent Document 2]
IEEE 802.3 CSMA/CD (ETHERNET): http://www.grouper.ieee.org/groups/802/3

In the image processing apparatus connectable to the PC through the local I/F or the network I/F as described above, the sending and receiving of the data can be performed with the PC side.

For example, as to a scan function of the image processing apparatus having the scanner, it will be appreciated that, in the type of the operation of the scan-function at present, there are known a so-called PULL scan function for starting a series of operations from the PC by operating a scan driver which is an application operated on the PC, and a so-called PUSH scan function for transmitting a signal to the application of the PC side by depressing a key of the apparatus side and starting a series of operations from the apparatus side.

Particularly, in the later type of the PUSH scan function, since there exists only one set of the PC as a partner at the time of the local I/F connection, when a protocol assumed in advance between the apparatus and a scan driver is followed, it is possible to provide a usage method which completes a scan action at one time only of the key operation and is easy to use.

However, in case the image processing apparatus is connected to the network through the network I/F, since there is a possibility that there exist a plurality of PCs to which signals are to be transmitted, an operation to select and decide a destination to be communicated is required so as to send a scan image to a desired PC.

Further, in the case of the image processing apparatus comprising both of the local I/F and the network I/F, though a connection method with the PC can be arbitrarily selected by an user, heretofore, since the operation menu has been required to change depending on the image processing apparatus to be used and the interface to be connected, it has been necessary to register beforehand in the apparatus information as to which type of the interface is to be used.

Further, heretofore, there has been a problem that, every time the interface I/F used for the communication with the PC is changed, time and effort are spent for changing the registration information of the apparatus. Further, when a destination selection menu is operated at the time of the network I/F usage setting, even when there is only one destination, the selection operation is required, and thus, usability has been bad.

SUMMARY OF THE INVENTION

An object of the present invention is to solve the above described problems and to be able to easily perform the transmission of an image data to the host apparatus such as the PC in the image processing apparatus comprising both of the local interface and the network interface.

According to the present invention, there is an advantage that, by adopting the above described constitution, the transmission of the image data to the host apparatus such as the PC can be easily performed.

BRIEF DESCRIPTION OF THE DRAWINGS

FIG. 3A is an explanatory drawing showing the operation sequence of a PUSH scan in the network connection;

FIG. 4 is a flowchart showing an operation menu control at the PUSH scan time;

FIG. 5A is an explanatory drawing showing the configuration of a network I/F management portion; and FIG. 5B is an explanatory drawing showing the configuration of a local I/F management portion.

DESCRIPTION OF THE PREFERRED EMBODIMENTS

An Embodiment relating to an MFP comprising both of a network interface (remote host computer interface) such as LAN and the like and a local interface such as USB, RS232C and the like will be shown below. In the following embodiment, as one example of a communication mode with a PC as a host apparatus, an example will be shown in which the MFP comprises a scanner for image reading, and transmits an image data read from the scanner to the PC through a local or remote host computer interface.

First Embodiment

Figure 1:
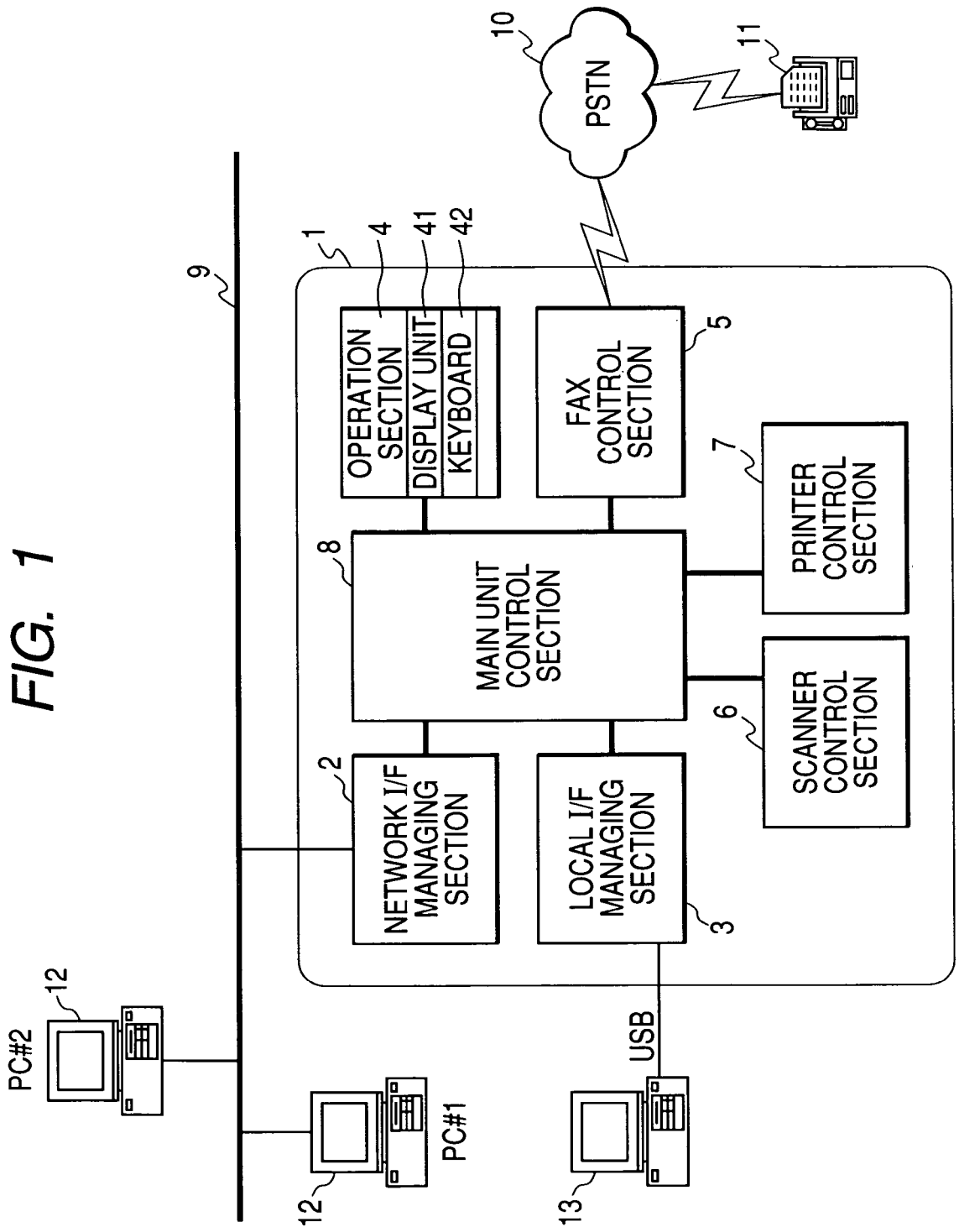
FIG. 1 is an explanatory drawing showing an MFP1 adopting the present invention and its connection configuration.

FIG. 1 shows a configuration of the MFP1 adapted by the present invention in a state in which a PC is connected to each interface of the local I/F and the network I/F in.

The MFP1 of FIG. 1 comprises a network I/F managing section 2, a local I/F managing section 3, an operation section 4 having a display unit 41 and a keyboard 42, a FAX control section 5, a scanner control section 6, a printer control section 7 and a main unit control section 8.

Each block of FIG. 1 comprises a corresponding hardware, respectively. For example, the network I/F managing section 2 comprises a network I/F hardware such as CSMA/CD and the like, and the local I/F managing section 3 comprises an I/F hardware such as the USB.

Further, the operation section 4 is provided with the hardware of the display unit 41 and the keyboard 42. In the present embodiment, the keyboard 42 of the operation section 42 includes, for example, a scan key as means for performing a predetermined operation for allowing the scanner control section 4 to start reading an image. The display unit 41 is configured by an indicating device such as a LCD panel and the like, and configures a user interface together with the keyboard 42.

The FAX control section 5 is provided with the hardware of a facsimile communication section which is connected to a public network 10 (analogue or digital PSTN) and which performs a facsimile communication of a facsimile procedure with another facsimile apparatus 11 and the like. Further, the scanner control section 6 is provided with the hardware of a scanner comprising an image sensor and a conveying system. The printer control section 7 is provided with a printer engine configured by an arbitrary image recording system such as an electrophotography system.

Further, blocks of FIG. 1 comprise programs for controlling the corresponding hardware, respectively. A group of these programs corresponding to the blocks are executed by using a CPU and a memory disposed inside the MFP1, and is operable in pseudo parallel by using a real time OS executed on the same CPU.

The main unit control section 8 corresponds to the hardware such as the CPU and the memory, and a program portion managing the whole apparatus.

A plurality of PCs 12 (PC#1 and PC#2 in FIG. 1) installed with a printer driver and a scanner driver which are applications to work with the MFP1 can be connected to the LAN 9, in which the user can operate the PC 12 so as to perform the operations of the printer and the scanner across the network. Further, the local I/F managing section 3 and a PC 13 are connected by the local connection I/F such as the USB and the like, thereby making the printer and the scanner operable similarly. Further, the MFP of FIG. 1 is connected to the public network 10 through the FAX control section 5, and can perform a facsimile communication with the communication apparatus such as another facsimile apparatus 11 and the like.

Next, in the PUSH scan action and the operation sequence among the user, the MFP1 and the PC in the present invention will be described with reference to FIGS. 2, 3A, 3B, and 3C. This PUSH scan, as described above, is a scan action which starts a scan by the initiative of a peripheral apparatus (MFP1 in the present embodiment) side, and transmits a data to the PC.

Figure 2:
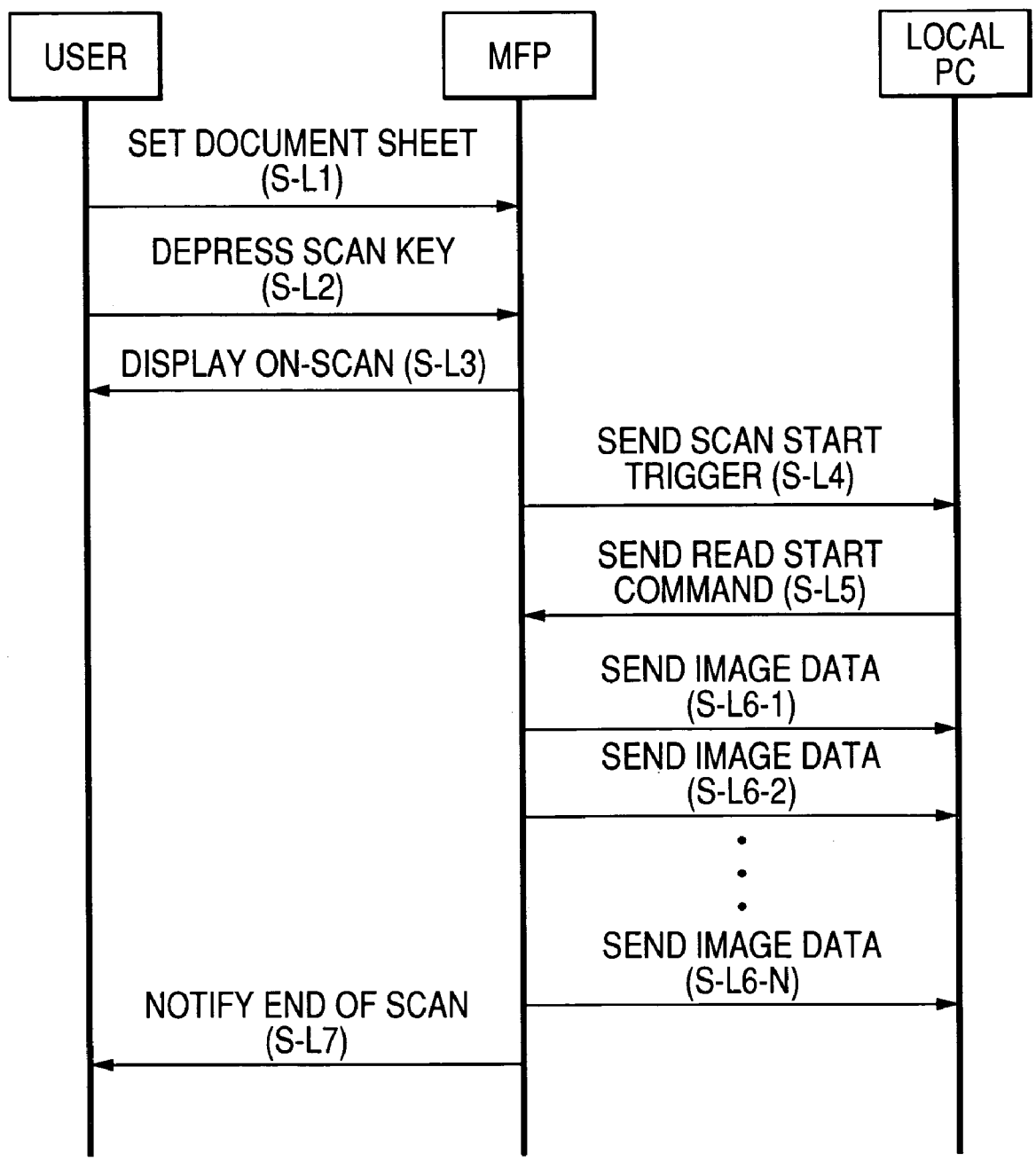
FIG. 2 is an explanatory drawing showing the operation sequence of a PUSH scan in the local connection.

FIG. 2 shows a sequence in case a connection is made on one for one basis with the PC 13 by using the local I/F (USB in FIG. 1) of the MFP. The user sets an original on the MFP1 (step S-L1), and depresses a scan key of the operation section 4 (step S-L2).

The MFP1 displays on the display unit 41 of the operation section 4 that it is in the middle of scan (on-scan) (step S-L3), and transmits a scan start trigger signal to the PC 13 through the USB (step S-L4).

When a scanner driver software which is an application on the PC 13 receives a trigger from the MFP1, it transmits a read start command to the MFP1 (step S-L5). The MFP1, while reading the original image by the scanner control section 6, separates the image data of a predetermined form read from the original in units of fixed size and transmits thus separated data to the PC 13 (step S-L6-1 to step S-L6-N). The MFP1, when having transmitted the data completely, displays the completion of the scan by the display unit 41 of the operation section 4 or informs the user of the completion of the scan operation by erasing a display for "on-scan" (step S-L7).

FIG. 3A shows a sequence in case the network I/F of the MFP1 is connected to the network (LAN in FIG. 1) on which a plurality of PCs (PC#1 and PC#2 in FIG. 1) exist.

When the user sets the original on the MFP1 (step S-N1), in case a plurality of PCs are registered in the MFP1 as destinations, an operation menu for expediting a selection of transmission destinations is displayed in the display unit 41 of the operation section 4 (step S-N2).

In case the PUSH scan is performed through the network I/F, a plurality of PCs connectable (data transferable) are allowed to be registered in the MFP1 as alternatives (this technique will be described later). The alternatives for the destination (data transfer destination) displayed in step S-N2 of FIG. 3A are registered in the MFP1 beforehand.

When the user, while looking at the display unit 41 of the operation section 4, selects the transmission destination (here PC#1) by the operation of the a key device (step S-N3), and depresses the scan key provided in the keyboard 42 of the operation section 4 (step S-N4), the MFP1 displays in the display unit 41 of the operation section 4 that it is in the midst of scan (step S-N5), and transmits the scan start trigger signal to the selected PC#1 (step S-N6).

Subsequently, similarly to the local connection, when the scanner driver software which is an application on the PC receives a trigger from the MFP1, it transmits a read start command to the MFP1 (step S-N7). The MFP1, while reading the original image by the scanner control section 6, separates the image data of a predetermined form read from the original in units of fixed size, and transmits thus separated data to the PC (step S-N8-1 to step S-N8-N).

When the MFP1 has transmitted the data completely, it displays the completion of the scan in the display unit 41 of the operation section 4 or informs the user of the completion of the scan operation by erasing the display for "on-scan" (step S-N9). In case only one alternative for the destination is registered, the operations of steps S-N2 and S-N3 are omitted, and the same sequence as the local connection is executed.

As described above, in case the PUSH scan is performed through the network I/F, it is necessary that one or plural of connectable (data transferable) PCs are allowed to be registered in the MFP1 as alternatives. The registration of the destination to which the scan data is transferred and the display thereof (step S-N2) can be, for example, performed as shown in FIG. 3B.

Figure 3B:
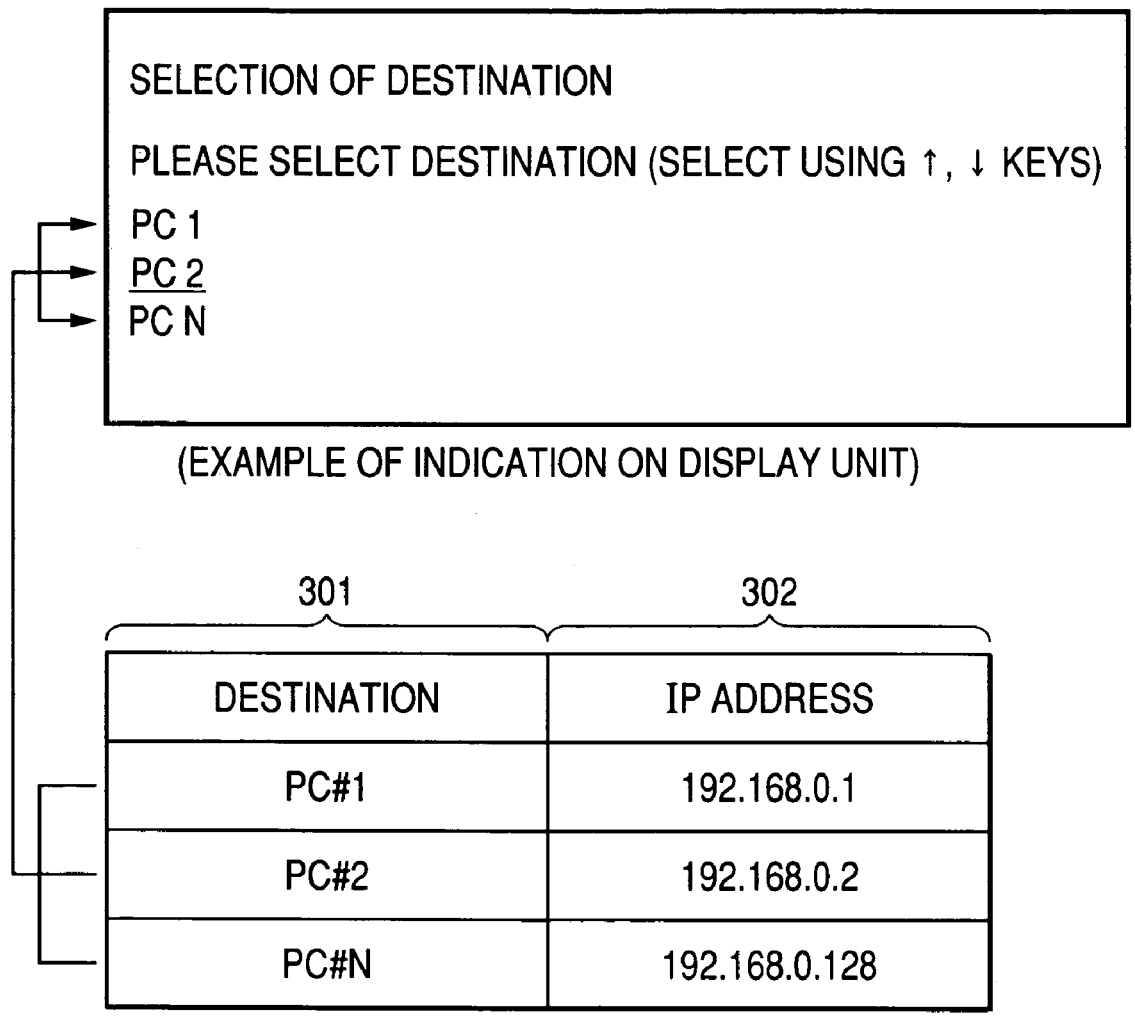
FIG. 3B is an explanatory drawing showing one example of destination registration information and a destination selection display.

FIG. 3B shows a configuration of the registered data of the destination to which the scan data is transferred, and a display mode of the destination corresponding to the same. As shown in the drawing, the destination registration is performed by storing the destination managing information made by a pair of data that is, a PC identifier character string 301 legible by the user and a network address 302 such as an IP address in which the destination (or MAC address of a network card which configures the network I/F managing section 2) is uniquely identified on the memory (for example, provided as the hardware corresponding to the main unit control section 8) of the MFP1. This registration of the destination managing information may be manually inputted by the user or automatically performed by using the network protocol.

The upper portion of FIG. 3B shows one example of a user interface for the selection of the destination displayed in the display unit 41 of the operation section 4 at step S-N2 of FIG. 3A correspondingly to the destination managing information of the under portion of FIG. 3B. Here is shown a state at the time when a cursor is moved by an unillustrated cursor key or a pointing device such as a mouse and the like provided in the keyboard 42 of the operation section 4, and the PC#2 is selected as a transfer destination.

Figure 3C:
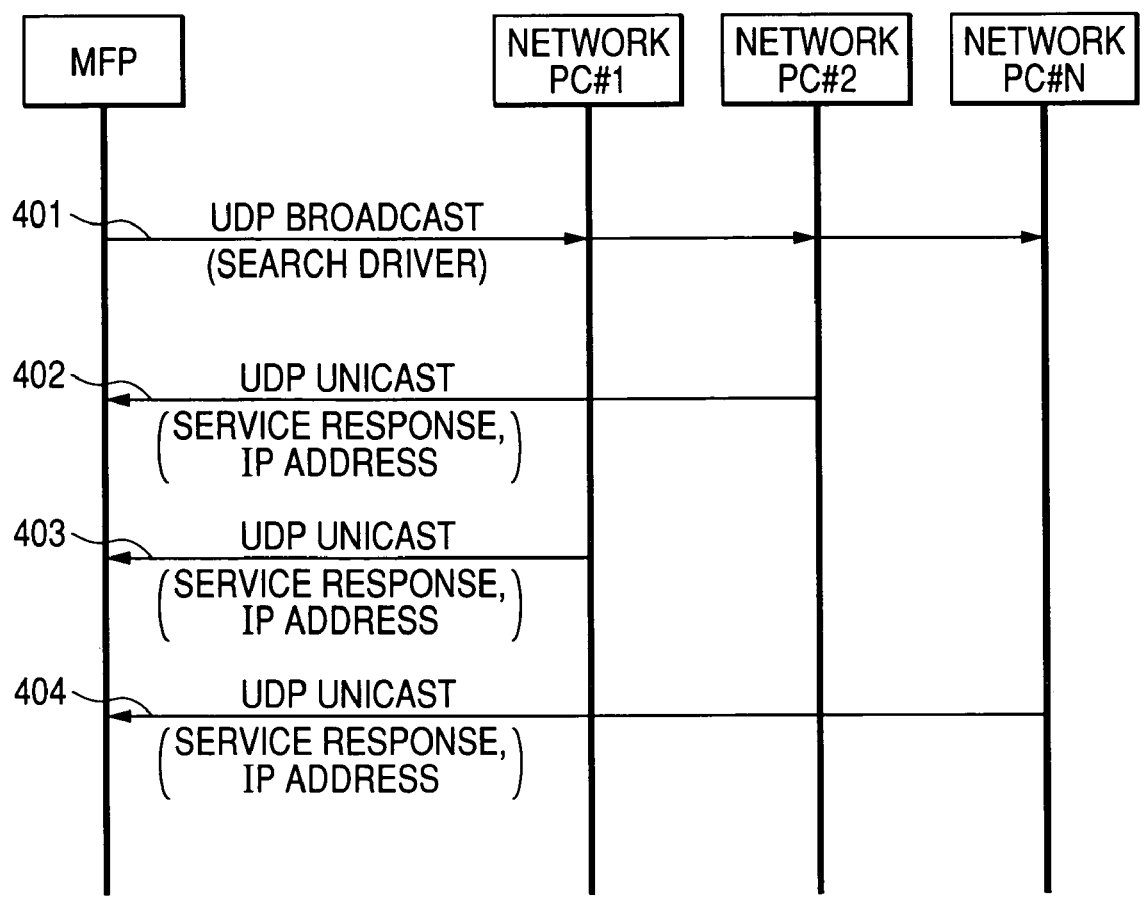
FIG. 3C is an explanatory drawing showing a destination automatic registration sequence by using a UDP/IP protocol.

FIG. 3C shows one example of the sequence for automatically executing the registration to the MFP1 by using the network protocol regarding the destination to which the scan data is transferred.

FIG. 3C shows an example of the destination registration sequence by using a UDP protocol, and as shown in the drawing, the MFP1 first retrieves a registrable PC (or other host apparatus) as the transfer destination. The registrable PC as the transfer destination is, to be more specific, a PC in which the scanner driver for causing the PC to operate as the scan data transfer destination of the present embodiment is installed, and in other words, the retrieval of this transfer destination is nothing but the retrieval of the scanner driver on the network. Consequently, here, the MFP1 transmits by using the UDP broadcast packet and at an arbitrary timing, a signal indicating that the scanner driver for causing, the PC to operate as the scan data transfer destination of the present embodiment is retrieved (401).

The scanner driver on the PC (PC#1 TO PC#N) on the network operates to analyze the content of the received UDP packet, and when the PC understands that it is the retrieval of the service that can be responded by itself, it returns a service response packet containing at least an IP address information of its own (402, 403, 404 . . . ). It is only natural that the PC in which the scanner driver is not installed cannot return this service response packet (402, 403, 404 . . . ).

The MFP1 which receives the service response packet (402, 403, 404 . . . ) writes the IP address (302 of FIG. 3B) extracted from the service response packet as the destination managing information shown in FIG. 3B together with the identification information (301 of FIG. 3B) of the PC. While the IP address itself of the PC can be extracted from the packet (data gram) of the UDP/IP, the identification information (301) of the PC may be stored in the service response packet (402, 403, 404) such as the character string suitably selected beforehand by the PC and transferred or a host name and the like obtained by performing a DNS reverse resolution and the like may be used as the identification information (301) of the PC.

Further, the format and protocol exchanged between the MFP and the PC in FIGS. 3A to 3C (or FIG. 2) are not particularly limited provided that they can be transmitted and received on the technical standard of each I/F.

Further, when the local connection in FIG. 2 is by the USB, an interrupt transfer is used for step S-L4, and a bulk transfer is used from step S-L5 to step S-L6, and then, exchanges are made between the MFP1 and the driver application by a predetermined signal format. Further, when the network connection in FIG. 3A is by TCP/IP, a port number that does not compete with other ordinary protocols is used, and the UDP/IP is used for step S-N6, and the connection based the TCP/IP is used for steps S-N7 to S-N8, and similarly to the local connection, exchanges may be made between the MFP and the driver application by a predetermined signal format.

Particularly in FIG. 3C, as for the destination retrieval of the MFP1, the UDP port number used by the PC for response, the format of the packet and the like, a suitable number or format may be selected beforehand. Also with regard to the TCP/IP communication used for the data transfer, the specification of the port number and that of the format of the packet can be arbitrarily selected.

Next, an automatic change of the operation menu according to the activity of the interface of the MFP1 will be described with reference to the flowchart of FIG. 4. Here, activated states of the network interface managed by the network I/F managing section 2 and the local interface managed by the local I/F managing section 3 are detected, and the selection processing of the above described transfer destinations is performed according to these activated states of the interfaces.

This processing of FIG. 4 must be executed at the image reading start time by the scanner control section 6.

First, when the above described PUSH scan operation and the like are performed, and the image reading is started by the scanner control section 6, whether or not the network I/F section is in the activated state is checked (step S-F1), and in case the network I/F section is in the activated state, the presence or absence of the registration of the destination PC is checked (step S-F2). When the registration of the destination PC is present, whether or not the local I/F section is in the activated state is further checked (step S-F3), and in case the local I/F section is also in the activated state, the PC connected to the local I/F section is also added to the destination managing information of FIG. 3B as one of the destination PCs as alternative (step S-F4).

After that, whether or not there are more than one alternative registered in the destination managing information is checked (step S-F5), and when there are more than one alternative, the destination selection menu is displayed, thereby urging the user to perform the destination selection operation (step S-F6). As shown in the drawing, in case the PC connected to the local I/F section is also added to the destination managing information of FIG. 3B as one of the destination PCs, in the display of the user interface of the upper portion of FIG. 3B, the PC connected to the local I/F section is also displayed as an alternative.

When one of the destinations displayed is selected and decided, the transmission destination is confirmed, and that destination is decided as a destination to which the trigger signal for starting the PUSH scan is to be transmitted (step S-F7). Further, when only one destination is available (step S-F5), the destination selection processing is omitted, and that destination is selected (step S-F7).

In the meantime, in case the network I/F is inactivated at step S-F1, whether or not the local I/F is in the activated state is checked (step S-F8), and in case the local I/F is in the activated state, the PC of the local connection is decided as the destination (step S-F7). Further, in case the local I/F is inactivated at step S-F8, since there is not available any PC to connect, the scan action is not started but terminated (error completion).

In the operation of the destination selection menu at step S-F6, one of the PCs as a default host apparatus may be selected beforehand as the transmission destination of the image data. In case the user does not explicitly select a host apparatus in the operation of the destination selection menu, this default host apparatus is selected as the transmission destination of the image data. This default transmission destination of the image data can used for an abbreviation of input of a transmission destination. For example, the default destination is displayed beforehand as one of the alternatives in the display screen shown in FIG. 3B, or the name and IP address of the default host apparatus are put into an already inputted stated when the destination selection menu is displayed in case a text input field and the like is used for the user to designate the host.

Here, a configuration example for discriminating the activated state of the I/F at steps S-F1, S-F3, and S-F8 of FIG. 4 will be shown in FIGS. 5A and 5B.

FIGS. 5A and 5B show detailed configurations of the network I/F managing section 2 and the local I/F managing section 3, and configuration examples of the control information and flag controlled by the managing sections 2 and 3, respectively.

As illustrated, the network I/F managing section 2 and the local I/F managing section 3 are configured by hardware layers 2002 (CSMA/CD) and 3002 (USB), and device drivers (software) 2001 and 3001 which control these hardware layers 2002 and 3002, respectively.

To control the hardware layers and to determine the activated state of the above described interfaces, the network I/F managing section 2 and the local I/F managing section 3 use control information groups 2003 and 3003. The control information groups 2003 and 3003 include identification information 2004 and 3004 showing the type of interfaces, flags 2005 and 3005 allowing or approving an operation, flags 2006 and 3006 displaying an error developmental state respectively, and further, they include flags 2007 and 3007 usable as one factor of the determination of the activated state of the interfaces, respectively.

The flags 2007 and 3007 are flags peculiar to respective interfaces, and the flag 2007 is a flag to show that the network interface is in a [UP] state (operable state), and the flag 3007 is a flag to show that a power source supply is performed from a USB bus.

Respective device driver 2001 and 3001 read information on the hardware and writes the state thereof one after another in a managing information area, and in the meantime, the network I/F managing section 2 and the local I/F managing section 3 can read the states of the control information groups 2003 and 3003, respectively, at an arbitrary timing, and thereby, whether or not the interfaces are in the activated state or inactivated state can be determined through the state of flags of the control information groups 2003 and 3003, respectively.

As described above, in the present embodiment, there is equipped with means for discriminating activated state indicating whether or not the local interface and the network interface are utilizable. When the PUSH scan operation is performed, in case the local interface is in the activated state, a series of actions are started conventionally by a predetermined operation of the operation section 4, that is, only by depressing the scan key of the keyboard 42, and in the meantime, in case the network interface is in the activated state, since a control is made in such a way as to automatically change the operation menu to urge the destination selection operation to be performed after (or before) the scan key is depressed, there is no need to conventionally change the menu or to change the registration information for each of the local interface and the network interface, and the scan action is performed by a simple operation. Therefore, the present invention can provide an MPF having excellent usability.

Further, in case only one alternative of the menu is registered as the destination of the data transfer, the destination selection operation (display of the menu and its operation) is omitted, and similarly to the local I/F being used, that registered destination can be automatically used as the data transfer destination. Therefore, unnecessary operations of the user can be reduced, and the usability of the MFP can be widely enhanced.

Further, according to the control shown in FIG. 3C, since the driver software corresponding to the PC side is prepared and the destination of the data transfer to which can be transferred the image data of the present invention through a predetermined protocol, can be automatically retrieved by using the predetermined retrieval protocol on the network, there is no need for the user to manually perform the registration processing of the data transfer destination, and the registration processing of the data transfer destination is performed by a fully automatic processing, and a suitable menu for selection of the data transfer destination can be displayed at the scan start time.

In the above described embodiment, though the PC was illustrated as the transfer destination of the data, needless to mention, as the host apparatus of the transfer destination, an arbitrary apparatus such as other image processing apparatus, communication apparatus and the like can be utilized.

Further, in the above described embodiment, though the PUSH scan operation using the scanner was illustrated, the data to be transferred to the transfer destination of the data is not limited to those read by the scanner, and the technology of the present embodiment can be executed, for example, even in case the image data received from other facsimile machine (11) and the like by the FAX control section 5 is transferred to the host apparatus such as the PC, and in that case, the above described selection control of the transfer destination, automatic registration control of the transfer destination and the like can be exactly similarly executed.

In case the FAX control section 5 transmits the inputted image data to the host apparatus, for example, it is considered that the image data automatically received from the public network 10 is transmitted to the host apparatus in response to reception of call (or completion of the reception) from the public network 10. In this case, the scan key operation described as a trigger for starting the transmission of the image data in the above described embodiment may be replaced with the reception of a call (or completion of the receiving) from the public network 10. Further, the technology of the present invention can be executed also in case the image data received by the FAX control section 5 and stored in an image memory is transmitted to the host apparatus. In this case, the scan key operation described as a trigger for starting the transmission of the image data in the above described embodiment may be replaced with a predetermined operation of the operation section 4 which commands the image data transmission.

Although the MFP is taken as the embodiment as described above, it is only natural that the present embodiment can be executed also in the facsimile machine or scanner apparatus having a single function.

Industrial Applicability

The present invention can be executed in an arbitrary image processing apparatus regardless of the format capable of communicating with the host computer through the network interface or the local interface. Further, the method or program of the present invention can be introduced to an object image processing apparatus through suitable memory mediums or through networks.

This application claims priority from Japanese Patent Application No. 2003-432438 filed Dec. 26, 2003, which is hereby incorporated by reference herein.

What is claimed is:

1. An image processing apparatus, which comprises a local interface through which a host apparatus is connected and a network interface through which other host apparatus(es) can be connected, and selects one of the host apparatus and the other host apparatus(es) as a transfer destination of image data, said image processing apparatus comprising:

registration means which registers one of the other host apparatus(es) which is connected through the network interface;

network determination means which determines whether the network interface is activated;

registration determination means which determines how many of the other host apparatus(es) are registered if the determination by said network determination means indicates that the network interface is activated;

first local determination means which determines whether the local interface is activated if the determination by said network determination means indicates that the network interface is inactivated or the determination by said registration determination means indicates zero;

second local determination means which determines whether the local interface is activated if the determination by said registration determination means indicates at least one;

addition means which adds one to the determination by said registration determination means if the determination by said second local determination means indicates that the local interface is activated;

first selection means which selects a host apparatus as the transfer destination based on a user selection if the addition by said addition means produces greater than one and selects a host apparatus automatically otherwise; and second selection means which selects a host apparatus as the transfer destination automatically if said determination by said first local determination means indicates that the local interface is active.

2. The image processing apparatus according to claim 1, wherein
information about one of the other host apparatus(es) to which the image data is transferred through a predetermined transfer protocol is retrieved on the network connected through the network interface by using a predetermined retrieval protocol, and
the one of the other host apparatus(es) is registered by said registration means.

3. The image processing apparatus according to claim 1, wherein, in a case in which only one host apparatus is selectable as the transfer destination of the image data, the one host apparatus is selected as the transfer destination of the image data without requiring a user selection.

4. The image processing apparatus according to claim 1, wherein
one of the host apparatuses connected through the local interface or the network interface is selected as a default host apparatus, and
in a case in which no host apparatus is selected by a user as the transfer destination of the image data, the default host apparatus is selected as the transfer destination of the image data.

5. The image processing apparatus according to claim 1, wherein the image data transmitted to the transfer destination of the image data is image data read by a scanner provided as image inputting means.

6. A control method for an image processing apparatus, which comprises a local interface through which a host apparatus is connected and a network interface through which other host apparatus(es) can be connected, and selects one of the host apparatus and the other host apparatus(es) as a transfer destination of image data, said method comprising:

a registering step of registering one of the other host apparatus(es) which is connected through the network interface;

a network determining step of determining whether the network interface is activated;

a registration determining step of determining how many of the other host apparatus(es) are registered if the determination in said network determining step indicates that the network interface is activated;

a first local determining step of determining whether the local interface is activated if the determination in said network determining step indicates that the network interface is inactivated or the determination in said registration determining step indicates zero;

a second local determining step of determining whether the local interface is activated if the determination in said registration determining step indicates at least one;

an adding step of adding one to the determination in said registration determining step if the determination in said second local determining step indicates that the local interface is activated;

a first selecting step of selecting a host apparatus as the transfer destination based on a user selection if the addition in said adding step produces greater than one and selecting a host apparatus automatically otherwise;

a second selecting step of selecting a host apparatus as the transfer destination automatically if said determination in said first local determining step indicates that the local interface is active.

7. The control method for the image processing apparatus according to claim 6, wherein
information about one of the other host apparatus(es) to which the image data is transmitted through a predetermined transfer protocol is retrieved on the network connected through the network interface by using a predetermined retrieval protocol, and
the one of the other host apparatus(es) is registered in said registering step.

8. The control method for the image processing apparatus according to claim 6, wherein, in case only one host apparatus is selectable as the transfer destination of the image data, the one host apparatus is selected as the transfer destination of the image data without requiring a user selection.

9. The control method for the image processing apparatus according to claim 6, wherein
one of the host apparatuses connected through the local interface or the network interface is selected as a default host apparatus, and
in a case in which no host apparatus is selected by a user as the transfer destination of the image data, the default host apparatus is selected as the transfer destination of the image data.

10. The control method for the image processing apparatus according to claim 6, wherein the image data transmitted to the transfer destination of the image data is image data read by a scanner.

11. A non-transitory computer-readable storage medium having a control program recorded thereon for executing a method to control an image processing apparatus, which comprises a local interface through which a host apparatus is connected and a network interface through which other host apparatus(es) can be connected, and selects one of the host apparatus and the other host apparatus(es) as a transfer destination of image data, said method comprising:

a registering step of registering one of the other host apparatus(es) which is connected through the network interface;

a network determining step of determining whether the network interface is activated;

a registration determining step of determining how many of the other host apparatus(es) are registered if the determination in said network determining step indicates that the network interface is activated;

a first local determining step of determining whether the local interface is activated if the determination in said network determining step indicates that the network interface is inactivated or the determination in said registration determining step indicates zero;

a second local determining step of determining whether the local interface is activated if the determination in said registration determining step indicates at least one;

an adding step of adding one to the determination in said registration determining step if the determination in said second local determining step indicates that the local interface is activated;

a first selecting step of selecting a host apparatus as the transfer destination based on a user selection if the addition in said adding step produces greater than one and selecting a host apparatus automatically otherwise;

a second selecting step of selecting a host apparatus as the transfer destination automatically if said determination in said first local determining step indicates that the local interface is active.

12. The storage medium according to claim 11, wherein information about one of the other host apparatus(es) to which the image data is transferred through a predetermined transfer protocol is retrieved on the network connected through the network interface by using a predetermined retrieval protocol, and the one of the other host apparatus(es) is registered in said registering step.

13. The storage medium according to claim 11, wherein, in a case in which only one host apparatus is selectable as the transfer destination of the image data, the one host apparatus is selected as the transfer destination of the image data without requiring a user selection.

14. The storage medium according to claim 11, wherein one of the host apparatus(es) connected through the local interface or the network interface is selected as a default host apparatus, and in a case in which no host apparatus is selected by a user as the transfer destination of the image data, the default host apparatus is selected as the transfer destination of the image data.

15. The storage medium according to claim 11, wherein the image data transmitted to the transfer destination of the image data is image data read by a scanner.

* * * * *